Dec. 23, 1958   W. J. GAMBONI ET AL   2,865,135
GRAPE LEAF STRIPPING MECHANISM
Filed March 18, 1957   2 Sheets-Sheet 2

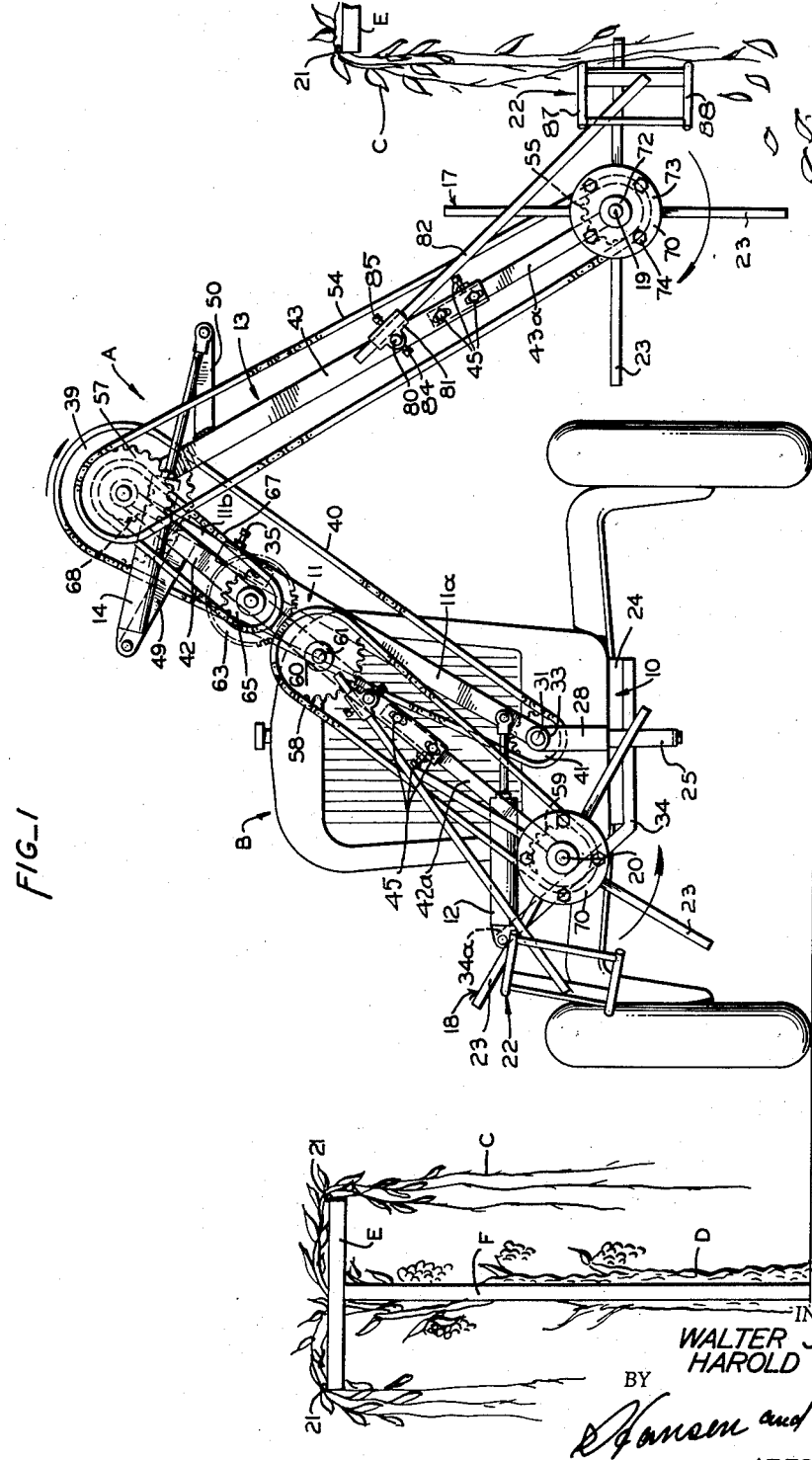

FIG_2

FIG_3

INVENTORS
WALTER J. GAMBONI
HAROLD D. NELSON
BY
*Hansen and Lane*
ATTORNEYS

United States Patent Office 2,865,135
Patented Dec. 23, 1958

2,865,135
GRAPE LEAF STRIPPING MECHANISM
Walter J. Gamboni and Harold D. Nelson, Delano, Calif.
Application March 18, 1957, Serial No. 646,659
6 Claims. (Cl. 47—1)

The present invention relates to viticulture, and pertains more particularly to a machine for stripping the leaves from the canes of grapevines.

In growing certain types of grapes, particularly the grapes grown for fresh shipment to local and eastern markets, it has been found that by stripping the leaves from the canes on either side of the vines, the grapes will attain a deeper coloring, and their flavor will be improved, while at the same time there is better air circulation around the grapes, which helps prevent rotting of the grapes, and they are more fully exposed for picking when the time comes.

In many vineyards specializing in high grade grapes the leaves are stripped from the canes by workmen passing along the rows of vines, grasping the canes near their upper ends, and then stripping the cane downwardly. This hand stripping of the leaves from the canes is expensive and time consuming, and is only justified in the case of the choicest of grapes which will bring a premium price in the market sufficient to pay for this extra labor.

Many vineyard operators would like to employ stripping on other than the choicest grapes, but are deterred by the high labor costs.

An object of the present invention is to facilitate and cheapen the stripping of leaves from the canes of grape vines.

The invention also provides an improved mechanism for stripping the leaves from the canes of grapevines at selected heights.

These and other objects and advantages of the invention will be apparent from the following description and the accompanying drawings, wherein Fig. 1 is a front elevational view of a grapeleaf stripper embodying the invention mounted on the front end of a power driven tractor.

Fig. 2 is a side elevational view of the arrangement of Fig. 1, the rear portion of the tractor being broken away.

Fig. 3 is a fragmentary perspective view of a cane deflector.

Briefly, the invention is embodied in a leaf stripping mechanism A comprising a support frame 10 removably secured to the forward end of a wheeled vehicle, such as a tractor B. A swinging support arm 11 is pivotally mounted on the frame 10 for lateral swinging adjustment by control means such as a first hydraulic cylinder 12.

An A-frame 13 is journaled at its apex for pendulum support on the upper end of the swinging support arm 11. A second hydraulic cylinder 14 forms a connecting link between the A-frame 13 and the support arm 11 for lateral swinging adjustment of the A-frame.

A pair of leaf stripping beaters 17 and 18 are journaled on horizontal shafts 19 and 20, respectively, on the lower ends of the A-frame 13, and are rotatably driven for advancing into the canes C of a row of grape vines D having the non-fruiting canes thereof draped over a support wire 21. A cane deflector 22, for deflecting straggling canes outwardly into the stripping zone of the beaters is adjustably mounted on each side of the A-frame 13. The beaters 17 and 18 are provided with flexible beater arms 23, and are driven in opposite directions, as indicated by the arrows in Fig. 1.

Referring to the drawings in detail, the present invention is intended primarily for use on grapes grown in rows and with their non-fruiting canes C supported on wires 21 strung on the cross arms E of posts F.

The stationary support frame 10 is constructed and arranged for mounting on a vehicle, such as the tractor B, with which it is intended to be used. As illustrated, the frame 10 comprises a horizontal frame member 24 secured to the forward end of the tractor B, and is braced by an angle brace 25 extending from the frame member 24 to the lower end of a stud 27, secured to the under side of the tractor. A standard 28, welded to the frame member 24, has a bearing 29 secured to its upper end in axial alignment with the power take-off shaft 30 of the tractor B.

A lower drive shaft 31 is journaled in the bearing 29, and is connected co-axially, by a conventional flexible coupling 32, to the power take-off shaft 30. The swinging support arm 11 comprises a steel tube lower portion 11a of square cross sectional shape with a support bearing 33 secured at its lower end. The bearing 33 has its axis perpendicular to the longitudinal center line of the tube 11a, and is journaled on the lower drive shaft 31 forwardly of the bearing 29.

A laterally extending bracket bar 34 is secured to the under side of the horizontal frame member 24, its outer end portion 34a (Fig. 1) extending angularly upwardly and outwardly. The lower hydraulic cylinder 12, a conventional hydraulic cylinder, is linked between the upper, outer end 34a of the bracket bar 34 and the swinging support arm 11. The hydraulic cylinder 12 is connected by conventional valve arrangement to a usual hydraulic system driven from the tractor B in a conventional manner. Since such hydraulic systems and control valves are well known, and since they form no part of the present invention per se, they are not illustrated or described herein.

A square tubular upper extension 11b is telescopically fitted into the upper end of the lower tubular swinging support arm member 11a, and is secured in axially adjusted condition therein by set screws 35. An upper support arm bearing 37 is secured to the upper end of the tubular extension 11b in axially parallel relation with the lower swinging arm bearing 33, and an upper driven shaft 38 is journaled in this upper bearing 37.

A driven sprocket 39 is secured on the rear end of the upper shaft 38, and is connected by a drive chain 40 to a drive sprocket 41 secured on the lower drive shaft 31. The A-frame 13 comprises a pair of rectangular, tubular, upper leg portions 42 and 43 secured divergently to an A-frame support bearing 44 journaled on the upper driven shaft 38 forwardly of the upper swinging support arm bearing 37. The upper A-frame leg portions 42 and 43 are of square tubing, similarly to the lower swinging support arm tube 11a, and are mounted in a common plane perpendicularly to the axis of the bearing 44 to which they are secured.

Lower leg extensions 42a and 43a are inserted telescopically into the lower ends of the upper A-frame leg members 42 and 43, respectively, and are secured in axially adjusted condition therein by set screws 45.

Beater bearings 47 and 48 are secured on the lower ends of the leg extensions 43a and 42a, respectively, with the axes of these bearings parallel to that of the upper A-frame bearing 44.

The second hydraulic cylinder 14, for swinging the A-frame 13 on the upper shaft 38 to adjusted position relative to the swinging support arm 11, is linked between the outer ends of two bracket arms 49 and 50 secured to extend laterally from opposite sides of the swinging support arm 11 and upper A-frame leg member 43, respectively.

The upper hydraulic cylinder 14, like the lower one 12, is controlled by usual control valves and a conventional hydraulic system, not shown.

The beater support shafts 19 and 20 of appropriate lengths are journaled in the beater bearings 47 and 48, respectively, and the pair of substantially identical beaters 17 and 18 are secured on the forward ends of the shafts 19 and 20, respectively. The beater 17 is driven by a chain 54, which passes around a sprocket 55 secured to the beater shaft 19, also around a sprocket 57 secured on the upper driven shaft 38. Beater 18 is driven reversely to beater 17 by a chain 58 which passes around a sprocket 59 secured to the beater shaft 20 and also around an intermediate sprocket 60. The intermediate sprocket 60 is journaled on a stub shaft 61, which is secured to the upper A-frame member 42 to extend forwardly therefrom. A driven gear 62 is secured co-axially to the sprocket 60 to rotate therewith, and is in driven relation with a drive gear 63 journaled on a second intermediate stub shaft 64, also mounted on the forward side of the upper A-frame member 42, and axially parallel to stub shaft 61.

Protective shields, not shown, of a conventional type preferably are provided over the lower ends of the beater drive chains 54 and 58 and their respective beater sprockets 55 and 59 to reduce the probability of the vines being caught between the sprockets and their chains. Since such shields are well known, and if illustrated would obstruct more important details of the drawings, they are not shown.

A sprocket 65 is secured co-axially to the drive gear 63, and is driven by a chain 67 from a sprocket 68 secured on upper, driven shaft 38. Thus, when the upper driven shaft 38 is rotatively driven in the direction of the arrow at the top of Fig. 1, the beaters will be driven in opposite directions as indicated by the arrows thereon in Fig. 1 to swing their arms on the outer sides of the A-frame downwardly.

Each beater 17 and 18 comprises a pair of reversely mounted hub portions 70 and 71, each having a central outer boss 72 and a co-axial disc portion 73. Each pair of reversely mounted hub members 70 and 71 is secured co-axially on its beater shaft and is drawn together by bolts 74 to clamp the inner ends of a plurality of radially extending, resiliently flexible beater arms 23 therebetween. As illustrated, these arms consist of lengths of conventional rubber V-belting, which, as is well known, comprises a formed structure of canvas or cords embedded in vulcanized rubber.

Each cane deflector 22, for deflecting laterally outwardly any canes which may project too far beyond their supporting wire 21, is mounted on a bracket 80 of bar steel secured to each A-frame upper leg member 42 and 43. Each deflector support bracket 80 extends forwardly from its supporting leg to a point ahead of the beater 17 or 18 for which it is provided.

A double socketed connector 81 has one socket thereof adjustably fitted onto a forward portion of each bracket 80, and a deflector support shaft 82 is inserted in the other socket of the connector for slidable adjustment lengthwise thereof. Set screws 84 and 85 secure the connector 81 and the deflector support shaft 82 in adjusted condition. Each deflector 22 comprises a pair of runner-like deflector rods 87 and 88 mounted with major straight rearward portions 89 thereof substantially parallel to the direction of movement of the tractor B along the vine rows. Forward end portions 90 of the rods 87 and 88 are curved inwardly to cam any straggling vines outwardly into the effective path of the beater arms 23.

In using the machine A, tilting of the swinging support arm 11 from an angular position on one side of the tractor B as shown in Fig. 1, to a similar angular position on the other side of the tractor is accomplished by actuating the lower hydraulic cylinder 12. Swinging adjustment of the A-frame 13 relative to the swinging support arm 11 is accomplished by actuating of the upper hydraulic cylinder 14.

Since either beater, when swung laterally outwardly to operative position, is within full view of the tractor operator, selective operation of the hydraulic cylinders 12 and 14 permits accurate projection of either beater laterally of the tractor, and elevation or lowering of the projected beater as desired to engage the vines at a selected height. It will be understood by those familiar with the art that the separation between adjacent rows of vines is considerably greater than the width of an ordinary tractor, so that in traveling along between the vine rows there is no danger of interfering with the other vine row than that upon which the operator is working.

By steering the tractor and adjusting the cane deflectors 22, the operator may advance the projected beater, such as the beater 17 in Fig. 1, a required distance into the vines, and at a selected height to accomplish a desired leaf stripping effect. Obviously, the greater the distance the beater blades are advanced laterally into the vines, the greater will be the length of their stripping action. The speed of operation of the beaters should be controlled so as to do an effective job of stripping the leaves, but not to injure the vines.

While the beaters are shown as driven by chain, sprocket and reverse gearing from the tractor's power take-off shaft 30, it is obvious that other well known types of drives may be employed. Since such modifications are within the capabilities of a routine worker in the art it will be unnecessary to illustrate or describe them in detail herein.

The invention provides a simple and inexpensive mechanism for rapidly and economically stripping the leaves from wire-supported canes of row-planted grape vines. It is customary to plant the vines in rows running generally east and west. Since the cane and leaf growth is heavier on the south side of the vines, the leaves preferably are stripped first from the south sides of the rows, and then at a later date from the north side. As the machine completes the stripping operation on each row of vines, and is turned around the end of the row to strip the same side of the next row of vines, it becomes necessary to swing the support arm 11 to the opposite side of the tractor, and to readjust the A-frame 13 on its supporting shaft 38, thereby to project the other beater into laterally projecting, operable condition, and at a desired height. This may be easily accomplished by actuation of the hydraulic cylinders 12 and 14.

The invention provides a simple, inexpensive leaf stripping machine, which will effectively strip the leaves from the row-planted vines of a relatively large vineyard area in a short space of time, and, by means of only one tractor and the time of only a single operator, will do the work of large numbers of relatively highly paid hand laborers.

While we have illustrated and described a preferred embodiment of the present invention, it will be understood however, that various changes and modifications may be made in the details thereof without departing from the scope of the invention as set forth in the appended claims.

Having thus described the invention, what we claim as new and desire to protect by Letters Patent is defined in the following claims.

We claim:

1. A grape leaf stripping mechanism comprising a main frame for mounting on an end of a supporting vehicle, a support member movably mounted on said main frame for movement transversely of such vehicle, means for adjusting said support member relative to the main frame, a beater frame pivotally mounted on said support member for pivotal movement about an axis extending lengthwise of a vehicle upon which said main frame is mounted, whereby the beater frame is movable transversely with the support member, means for adjusting the beater frame pivotally about its axis of support on the support member, a pair of beaters mounted in laterally spaced relation on said beater frame for rotation in planes substantially perpendicular to the pivotal axis of the beater frame, and drive means mounted rotatably to drive said beaters in opposite directions with the laterally outward portions of said beaters moving downwardly, whereby said beaters may be projected laterally from selected sides of the main frame by controlled transversely movement of said support member, and may be selectively elevated and lowered by controlled pivotal movement of the beater frame.

2. A grape leaf stripping mechanism comprising a main frame for mounting on an end of a supporting vehicle, a support member tiltably mounted on said main frame for tilting movement back and forth transversely of such vehicle, means for tiltably adjusting said support member, a beater support frame pivotally mounted on the free end of said support member for pivotal movement about an axis extending lengthwise of a vehicle upon which said main frame is mounted, whereby the beater frame is movable transversely of such supporting vehicle by a tilting movement of the support member, means for adjusting the beater frame pivotally about its axis of support on the support member, a pair of beaters mounted in laterally spaced relation on said beater frame for rotation in planes substantially perpendicular to the pivotal axis of the beater frame, and drive means mounted rotatably to drive said beaters in opposite directions with the laterally outward portions of said beaters moving downwardly, whereby said beaters may be projected laterally from selected sides of the main frame by controlled transverse movement of said support member, and may be selectively elevated and lowered by controlled pivotal movement of the beater frame.

3. A grape leaf stripping mechanism comprising a main frame for mounting on an end of a supporting vehicle, a support member movably mounted on said main frame for movement transversely of such vehicle, means for tiltably adjusting said support member, a beater support A-frame pivotally mounted at its apex on said support member for swinging movement about an axis extending lengthwise of a vehicle upon which said main frame is mounted, whereby the beater frame is swingable about its axis of support on the support member, means for adjusting the beater frame pivotally about said axis of support, a pair of beaters mounted one on each side of said A-frame at a point remote from said axis of support for rotation in planes substantially perpendicular to the pivotal axis of the beater frame, and drive means mounted rotatably to drive said beaters in opposite directions with the laterally outward portions of said beaters moving downwardly, whereby said beaters may be projected laterally from selected sides of the main frame by controlled transverse movement of said support member, and may be selectively elevated and lowered by controlled pivotal movement of the beater frame.

4. A grape leaf stripping mechanism comprising a main frame for mounting on an end of a supporting vehicle, a support member movably mounted on said main frame for movement transversely of such vehicle, a first hydraulic cylinder interconnecting said support and said main frame for adjusting said support member relative to the main frame, a beater pivotally mounted on said support member for pivotal movement about an axis extending lengthwise of a vehicle upon which said main frame is mounted, whereby the beater frame is movable transversely with the support member, a second hydraulic cylinder interconnecting said support member and the beater frame for adjusting the beater frame pivotally about its axis of support on the support member, a pair of beaters mounted in laterally spaced relation on said beater frame for rotation in planes substantially perpendicular to the pivotal axis of the beater frame, and drive means mounted rotatably to drive said beaters in opposite directions with the laterally outward portions of said beaters moving downwardly, whereby said beaters may be projected laterally from selected sides of the main frame by controlled transverse movement of said support member, and may be selectively elevated and lowered by controlled pivotal movement of the beater frame.

5. A grape leaf stripping mechanism comprising a main frame for mounting on an end of a supporting vehicle, a support member pivotally mounted on said main frame for swinging movement transversely of said vehicle, a beater frame mounted on said support member and adjustable relative thereto parallel to the swinging movement of the support member, beater means having radial arms thereon rotatably mounted on an outer portion of said beater frame, drive means operatively connected to said beater means for driving the beater means in a direction to move the laterally outward arms thereof downwardly through suspended grapevine canes for stripping the leaves therefrom, first control means for controlling the position of the support member relative to the main frame, and second control means for controlling the position of the beater frame relative to the support member, whereby said beater means may be projected laterally from selected sides of the main frame, and may be selectively elevated and lowered by said first and second control means.

6. A grape leaf stripping mechanism comprising a main frame for mounting on a supporting vehicle, a support member pivotally mounted on said main frame for swinging movement about a horizontal axis in a plane transversely of said vehicle, a beater frame mounted on an outer portion of said support member and adjustable relative thereto in a plane parallel to that of the swinging movement of the support member, beater means having radial arms thereon rotatably mounted on a radially outward portion of said beater frame, drive means operatively connected to said beater means for driving the beater means in a direction to move the laterally outward arms thereof downwardly through suspended grapevine canes for stripping the leaves therefrom, deflector means mounted ahead of the beater means and shaped and positioned to deflect grapevine canes toward the outer end of descending beater arms, first control means for controlling the position of the support member relative to the main frame, and second control means for controlling the position of the beater frame relative to the support member, whereby said beater means may be projected laterally from selected sides of the main frame, and may be selectively elevated and lowered by said first and second control means.

References Cited in the file of this patent

UNITED STATES PATENTS

| | | |
|---|---|---|
| 1,265,244 | Piatt | May 7, 1918 |
| 2,354,112 | Garst | July 18, 1944 |
| 2,656,667 | Smith | Oct. 27, 1953 |
| 2,684,555 | Kantack | July 27, 1954 |
| 2,691,861 | Lock | Oct. 19, 1954 |

FOREIGN PATENTS

| | | |
|---|---|---|
| 2,927 | Australia | of 1911 |